UNITED STATES PATENT OFFICE.

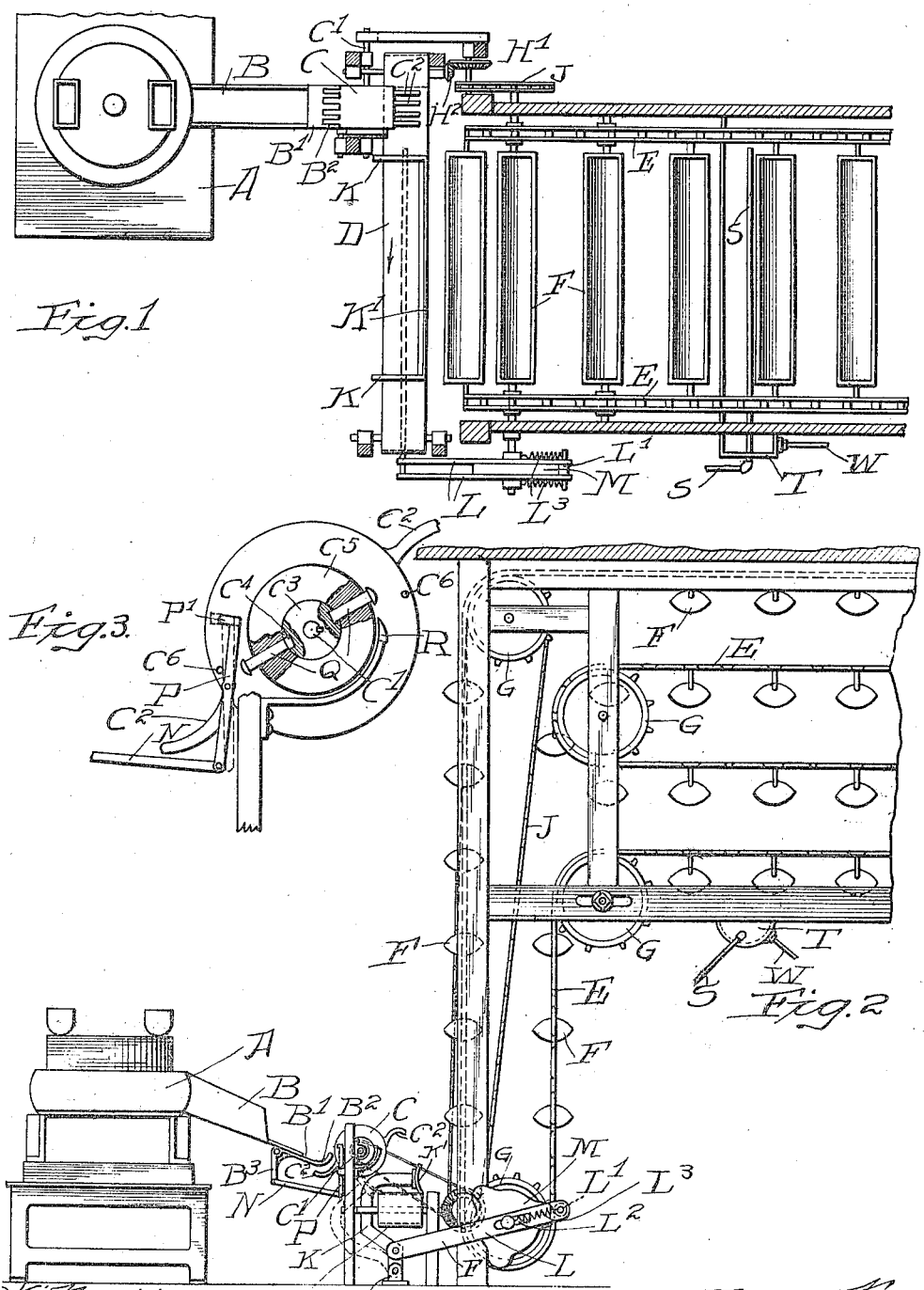

SAMUEL OLSON, OF CHICAGO, ILLINOIS.

BREAD-PROOFING APPARATUS.

1,038,784.      Specification of Letters Patent.     Patented Sept. 17, 1912.

Application filed January 8, 1912. Serial No. 669,960.

*To all whom it may concern:*

Be it known that I, SAMUEL OLSON, a citizen of the United States of America, residing at Chicago, in the county of Cook and State of Illinois, have invented new and useful Improvements in Bread-Proofing Apparatus, of which the following is a specification, reference being had to the accompanying drawings, forming a part thereof.

The purpose of this invention is to provide an improved construction in that part of a bread-making apparatus known as the proofing conveyer, particularly with a view to avoiding entirely any manual handling of the bread during this portion of the process.

It consists of the features and elements of construction described and shown in the drawings as indicated in the claims.

In the drawings: Figure 1 is a plan view showing one end of the proofing conveyer itself, together with the automatic devices which are the subject of this invention. Fig. 2 is a side elevation of the parts shown in Fig. 1. Fig. 3 is a detail view of the clutch-operating mechanism for the transferring drum.

There is conventionally illustrated at A a machine known in the art as the "rounder-up" or "baller" whose function is to form the dough into substantially spherical units. Leading from the baller there is shown a delivery chute at B, inclined downwardly and terminating in a hinged portion, B, whose extreme lower end is composed of a series of upwardly rounded fingers, $B^2$, designed to arrest the movement of the ball-shaped unit of dough as it is delivered from the baller, A.

A transferring drum, C, is mounted for rotation upon a shaft, $C^1$, extending transversely of the chute, B, just beyond its termination, and this drum, C, is provided with outwardly extending curved fingers, $C^2$, quite similar to the fingers, $B^2$, of the chute, but so positioned upon the drum, C, as to pass between the fingers, $B^2$, as the drum is rotated. In this way, by the rotation of the drum the ball of dough which is held by the fingers, $B^2$, will be picked up by the fingers, $C^2$, as they pass between the fingers, $B^2$, if the drum is rotated in clock-wise direction, as viewed in Fig. 2. As shown, the drum, C, is provided with two sets of fingers, $C^2$, arranged thereon at diametrically opposite points, but this arrangement is only preferred and not essential.

The dough being picked up by the fingers, $C^2$, is carried over with the drum about one-half revolution and is dropped upon a horizontally traveling apron, D, moving in the direction indicated by the arrow in Fig. 1. The driving connections for this apron, D, and the transferring drum, C, are geared together so that if the chute, B, is kept sufficiently supplied with balls of dough, these balls will be delivered upon the apron, D, at regular intervals and will thus be regularly spaced from one another thereon. The proofing conveyer proper, is mounted adjacent to the apron, D. It consists merely (so far as this invention is concerned), of an endless link belt, E, provided at regular intervals with trough-shaped buckets, F, pivotally suspended from the belt so as to be gravitationally held in proper position and prevented from ejecting their contents as the belt passes over its various guide wheels, G.

It is desired to transfer the balls of dough from the apron, D, into the buckets, F, so that each bucket shall contain four such balls or loaves equally spaced apart. For this reason, that part of the proofing conveyer which is nearest the apron, D, is arranged for vertical travel, the buckets moving upward past the side of the apron, D. The direction of travel of the conveyer is thus transverse to the direction of travel of the apron and its path may be said to be "laterally adjacent" to the path of travel of the apron. The apron, D, is driven through bevel gears, $H^1$ and $H^2$, which are in turn actuated through sprocket wheels, and a drive chain, J, arranged to transmit power from one of the guide wheels, G, of the proofing conveyer.

The ejection of the loaves from the apron, D, and their delivery into the buckets, F, is accomplished by a reciprocating pusher, K, consisting of a pusher-board, $K^1$, whose length in the direction of travel of the apron, D, is substantially equal to the length of one of the buckets, F, within which dimension the transferring drum, C, is arranged to deliver the four loaves desired. The pusher-board, $K^1$, is carried by a lever arm pivoted in a floor bracket, $K^2$, under the apron, D, and formed to reach around and above the apron. A pitman, L, connected at one end to the lever arm, K, and provided at its opposite end with a follower roller, L¹, in contact with a cam, M, is intended to communicate reciprocation to the pusher. The cam, M, is rigidly connected with the nearest of the idlers or guide wheels, G, and is thus driven by the travel of the conveyer chain, E. As shown, the pitman, L, is guided upon the shaft of its cam, M, being provided with a slot, L², for the purpose. A spring, L³, extends from this shaft to a point on the pitman, L, for holding the follower wheel, L¹, in close contact with the cam surface. By this mechanism there is caused a reciprocation of the pusher, K, at the instant when four loaves carried by the apron, D, come to the position opposite one of the buckets, F, of the proofing conveyer. The four loaves are thus simultaneously shoved off the apron, D, into the bucket, F, which continues its upward travel at such a rate relatively to the movement of the apron, D, that the next bucket, F, shall just come into receiving position when the next four loaves shall have arrived opposite it upon the apron, D.

It is conceivable and probable that occasionally the baller, A, may fail to deliver the loaves exactly on time and it will be seen that if such a loaf or ball of dough should be delivered just a moment too late to be picked up by the fingers, C², it would encounter the points of these fingers and would become hopelessly deformed, besides so smearing up the fingers and the drum, C, as to seriously interfere with the operation of the machine. To meet this contingency is the purpose of the hinging of the terminal portion, B¹, of the chute, B. Extending downwardly from the pivot or hinge of this member, B¹, there is shown a bell crank arm, B³, to which there is pivotally connected a link, N, extending to the lower end of a pivoted presser arm, P. The shaft, C¹, as may be noted from Fig. 3, is provided with a collar, C³, having notches, C⁴, formed in its periphery, and each dimensioned to receive the inner end of one of the clutch bolts, Q, which are slidably carried in the hub, C⁵, of the drum. The normal position of the clutch bolts is that in which they are disengaged from the notches, C⁴, of the shaft but whenever a loaf of dough arrives upon the terminal portion, B¹, of the chute, this terminal portion will be slightly depressed or rocked about its hinge pivot, thus moving the lever arm, B³, and the presser arm, P, the linkage being so arranged that the upper end of the presser arm is moved toward the shaft, C¹, far enough to push one of the clutch bolts, Q, into engagement with one of the notches, C⁴, as the shaft, C¹, revolves to a position permitting this action. As will be hereinafter explained, the drum, C, will always come to rest with one of the clutch bolts, Q, directly opposite the upper end of the presser arm, P, so that this means of throwing in the clutch will always be operative; since the shaft, C¹, is continuously revolving, its notches, C⁴, will however, not always be in position to receive the clutch bolt, Q, but this will merely result in slightly delaying the depression of the element, B¹, of the chute, and since the weight of the loaf is there present, the above described action will take place as soon as the notch, C⁴, becomes registered with the bolt, Q. To prevent the continuous rotation of the drum in case the next loaf is not delivered promptly enough to hold the presser arm, P, in operative position and thus insert the other clutch bolt, Q, into its corresponding notch, C⁴, there is provided at the far side of the drum from the chute, a wedge-shaped guide, R, positioned to engage the head of the clutch bolt as it passes, and thus to withdraw the bolt from the notch, C⁴. Just as the bolt is withdrawn, a pin, C⁶, projecting from the end of the drum, C, will be caught by the square-hooked end, P¹, of the presser arm, if the presser arm has returned to its normal position by reason of the non-arrival of the next loaf upon the hinged portion of the chute, B¹. Since the clutch bolts, Q, the notches, C⁴, and the pins, C⁶, are all provided in duplicate, the minimum delay of the drum by reason of late arrival of the dough will amount to a half revolution, but as the travel of the apron, D, is not retarded or arrested, this delay of the transferring drum, C, will result in the omission of one loaf from the regular quota of four.

It is well understood by those familiar with the art that the purpose of the proofing conveyer is to carry the loaves of dough into a properly heated, closed room, and to allow them to remain therein for a certain specified length of time in which they will " rise " or become " light ". It is also well known that if the atmosphere of this room be too dry, there will be formed an outer skin on each loaf which upon baking, becomes a crust which is thicker and tougher than desirable. To prevent the formation of such a surface, the present apparatus is provided in the proofing room with a series of open water troughs, T, through which there are laid steam pipes, S, it being intended that the heat of the steam shall be taken up by the water so as to cause slow evaporation of the latter in order to keep the atmosphere of the room properly moistened. Fig. 2 shows also a water supply pipe, W, which may be controlled by any desired form of automatic valve so as to maintain a constant water level in the trough, T.

I claim:—

1. In a device for the purpose indicated, an inclined chute terminating at its lower end in a series of fingers extending in the direction of the chute, a rotary element mounted for revolution about an axis extending transversely of the direction of the chute, said rotary element being provided with outwardly extending fingers positioned to register with the intervals between the fingers of the chute and thus adapted to pass between said fingers of the chute, a receiver for the material positioned at the opposite side of the rotary element from that to which the chute is adjacent, and means for revolving said rotary element.

2. In a device for the purpose indicated, an inclined chute terminating in a series of fingers extending in the direction of the chute, a shaft extending transversely of said direction of the chute beyond the end thereof, a drum mounted upon said shaft and provided with outwardly extending fingers positioned to register with the intervals between the fingers of the chute and thus adapted to pass said fingers when the drum is revolved, a portion of the chute being depressible by the weight of material thereon, a clutch device adapted to engage the drum with the shaft, operating means for said clutch device connected with the depressible portion of the chute, and means for revolving the shaft.

3. In a device for the purpose indicated, an inclined chute terminating in a series of fingers extending in the direction of the chute, a shaft extending transversely of said direction of the chute beyond the end thereof, a drum mounted upon said shaft and provided with outwardly extending fingers positioned to register with the intervals between the fingers of the chute and thus adapted to pass said fingers when the drum is revolved, the terminal fingered portion of the chute being hinged with the remainder, and depressible therefrom by the weight of material upon said hinged portion, a clutch device adapted to engage the drum with the shaft, operating means for said clutch device connected with the depressible portion of the chute, and means for revolving the shaft.

4. In a device for the purpose indicated, an inclined chute terminating in a series of fingers extending in the direction of the chute, a shaft extending transversely of said direction of the chute beyond the end thereof, a drum mounted upon said shaft and provided with outwardly extending fingers positioned to register with the intervals between the fingers of the chute and thus adapted to pass said fingers when the drum is revolved, a portion of the chute being depressible by the weight of material thereon, a clutch device comprising a notch in the shaft and a radially movable clutch bolt in the drum, a presser arm positionable to engage the outer end of the clutch bolt for thrusting said bolt into the notch of the shaft, a linkage connecting said presser arm with the depressible portion of the chute, and means for revolving the shaft.

5. In a device for the purpose indicated, an inclined chute terminating in a series of fingers extending in the direction of the chute, a shaft extending transversely of said direction of the chute beyond the end thereof, a drum mounted upon said shaft and provided with outwardly extending fingers positioned to register with the intervals between the fingers of the chute and thus adapted to pass said fingers when the drum is revolved, a portion of the chute being depressible by the weight of material thereon, a clutch device comprising a notch in the shaft and a radially movable clutch bolt in the drum, a presser arm positionable to engage the outer end of the clutch bolt for thrusting said bolt into the notch of the shaft, a linkage connecting said presser arm with the depressible portion of the chute, a pin extending from the end of the drum at a point radially beyond the outer end of the clutch bolt, the presser arm having an extension adapted to engage said pin for arresting the drum when said presser arm stands out of position for engaging the bolt.

6. In a device for the purpose indicated, an inclined chute terminating in a series of fingers extending in the direction of the chute, a shaft extending transversely of said direction of the chute beyond the end thereof, a drum mounted upon said shaft and provided with outwardly extending fingers positioned to register with the intervals between the fingers of the chute and thus adapted to pass said fingers when the drum is revolved, a portion of the chute being depressible by the weight of material thereon, a clutch device comprising a notch in the shaft and a radially movable clutch bolt in the drum, a presser arm positionable to engage the outer end of the clutch bolt for thrusting said bolt into the notch of the shaft, a linkage connecting said presser arm with the depressible portion of the chute, a wedge fixedly mounted in the path of rotation of the outer end of the clutch bolt substantially diametrically opposite the presser arm, the clutch bolt being adapted for engagement by said wedge and the wedge being formed to cause withdrawal of the bolt from the notch by such engagement, and means for revolving the shaft.

In testimony whereof I have hereunto set my hand at Chicago, Illinois, this 5th day of January, 1912.

SAMUEL OLSON.

Witnesses:
  EDNA M. MACINTOSH,
  M. GERTRUDE ADY.